US011036418B2

United States Patent
Tripathi

(10) Patent No.: US 11,036,418 B2
(45) Date of Patent: Jun. 15, 2021

(54) FULLY REPLACING AN EXISTING RAID GROUP OF DEVICES WITH A NEW RAID GROUP OF DEVICES

(71) Applicant: Intelliflash by DDN, Inc., Santa Clara, CA (US)

(72) Inventor: Shailendra Tripathi, Fremont, CA (US)

(73) Assignee: INTELLIFLASH BY DDN, INC., Santa Clara, CA (US)

( * ) Notice: Subject to any disclaimer, the term of this patent is extended or adjusted under 35 U.S.C. 154(b) by 182 days.

(21) Appl. No.: 16/447,893

(22) Filed: Jun. 20, 2019

(65) Prior Publication Data

US 2020/0401337 A1     Dec. 24, 2020

(51) Int. Cl.
    *G06F 12/00*     (2006.01)
    *G06F 3/06*     (2006.01)

(52) U.S. Cl.
    CPC .......... *G06F 3/0647* (2013.01); *G06F 3/0607* (2013.01); *G06F 3/0631* (2013.01); *G06F 3/0689* (2013.01)

(58) Field of Classification Search
    CPC .... G06F 3/0647; G06F 3/0607; G06F 3/0631; G06F 3/0689
    See application file for complete search history.

(56) References Cited

U.S. PATENT DOCUMENTS

| | | | |
|---|---|---|---|
| 7,958,304 | B1 | 6/2011 | Goel et al. |
| 9,164,689 | B2 | 10/2015 | O'Brien et al. |
| 9,454,539 | B1 | 9/2016 | Shuai et al. |
| 9,632,870 | B2 | 4/2017 | Bennett |
| 2013/0179480 | A1 | 7/2013 | Agarwal et al. |
| 2015/0347047 | A1 | 12/2015 | Masputra et al. |
| 2018/0198765 | A1 | 7/2018 | Maybee et al. |

OTHER PUBLICATIONS

Unkown, The Z File System (ZFS)—zpool Administration, 21 pages, downloaded from https://www.freebsd.org/doc/handbook/zfs-zpool.html.
Bonwick, Jeff, et al., The Zettabyte File System, 13 pages, downloaded from https://www.cpp.edu/~gkuri/classes/ece426/ZFS.pdf.
Unknown, ZFS—Ubuntu Wiki, 3 pages, last edited Jan. 22, 2019 by Seth Arnold, downloaded from https://wiki.ubuntu.com/ZFS.
Innodisk Corporation, Reliable RAID status monitoring tool, 1 page, downloaded from https://www.innodisk.com/en/iService/utility/iRAID.

(Continued)

*Primary Examiner* — Gurtej Bansal
(74) *Attorney, Agent, or Firm* — David R. Stevens; Stevens Law Group

(57) ABSTRACT

Systems and methods are described for fully replacing an online first RAID group of data storage devices with a second RAID group of data storage devices, whereby the data is read in parallel from multiple devices in the first group and written in parallel to multiple devices in the second group. Sub-chunks of data chunks not currently storing any data may be bypassed from copying, as well as sub-chunks still storing data that is no longer in-use by a client. The data may be copied as-is rather than from and to the same logical block address on each respective group. A similar process may be applied for shrinking the number of storage devices allocating to a storage pool.

18 Claims, 2 Drawing Sheets

(56) References Cited

OTHER PUBLICATIONS

Tripathi, Shailendra, et al., Intelligent Redundant Array of Independent Disks, U.S. Appl. No. 15/700,912, filed Sep. 11, 2017.
Tripathi, Shailendra, et al., Intelligent Redundant Array of Independent Disks With High Performance Recompaction, U.S. Appl. No. 15/887,960, filed Feb. 2, 2018.
Tripathi, Shailendra, et al., Intelligent Redundant Array of Independent Disks With Resilvering Beyond Bandwidth of a Single Drive, U.S. Appl. No. 15/887,971, filed Feb. 2, 2018.

FULLY REPLACING AN EXISTING RAID GROUP OF DEVICES WITH A NEW RAID GROUP OF DEVICES

FIELD OF EMBODIMENTS

Embodiments of the invention may relate generally to data storage systems and, more particularly, to fully replacing an existing RAID (Redundant Array of Independent Disks) group of storage devices with a new group of storage devices.

BACKGROUND

Currently, data storage devices in a RAID group can be concurrently replaced up to the device redundancy limit. Thus, in a RAID 6 system, which protects against two simultaneous device failures, at most two devices can be replaced online. If the RAID 6 group is composed of several devices (e.g. 8+2), which is a common configuration for a RAID 6 group, replacing the whole group of devices is a significantly expensive operation because, for each replacement procedure, all the devices are traversed to build the data on the replacement devices. Such a process is often referred to as resilvering. In the 8+2 example, replacing the entire group of devices would require five such iterations because, due to the redundancy level, only two devices can be replaced during each iteration. Furthermore, at the end of the migration there is a phase in which all existing clients need to be reconnected to new pool, with potential down time during the process.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to fully replacing an existing RAID group with a new group of devices are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Example Operating Environment: Data Storage System

There is a commercial demand for high-capacity digital data storage systems, in which multiple data storage devices (DSDs) are housed in a common enclosure. Data storage systems often include large enclosures that house multiple shelves on which rows of DSDs are mounted. A data storage system typically comprises a system enclosure, or "rack", in which multiple data storage system trays are housed. Each tray may be placed or slid into a corresponding slot within the rack, which also houses one or more system controllers, and may further house switches, storage server(s), application server(s), a power supply, cooling fans, etc.

Embodiments described herein may be used in the context of a data storage system in which multiple data storage devices (DSDs), such as spinning disk hard disk drives (HDDs), and/or solid state drives (SSDs) (i.e., memory devices using non-volatile memory such as flash or other solid-state (e.g., integrated circuits) memory that is electrically erasable and programmable), and/or hybrid drives (i.e., multi-medium storage devices or "multi-medium device" or "multi-tier device", all of which refer generally to a storage device having functionality of both a traditional HDD combined with an SSD), are employed.

Figure 1:
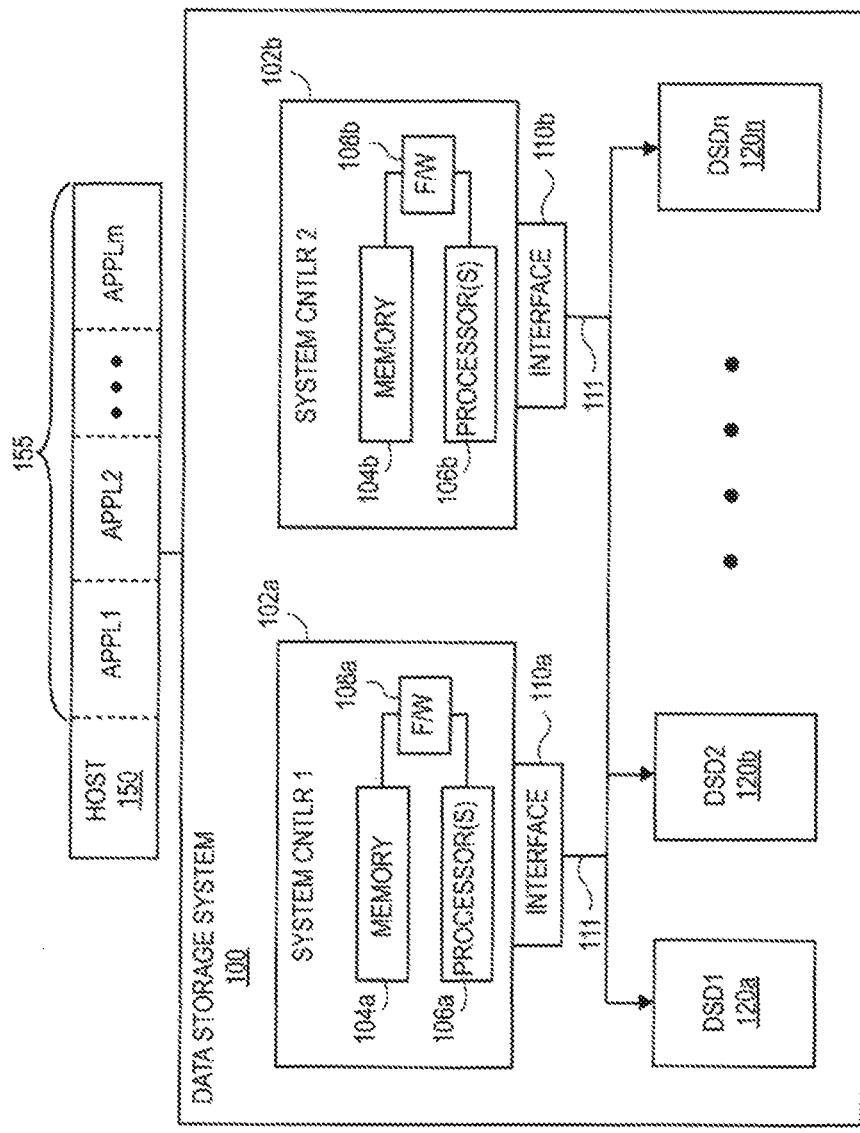
FIG. 1 is a block diagram illustrating a data storage system architecture, according to an embodiment.

FIG. 1 is a block diagram illustrating a data storage system architecture, according to an embodiment. The example architecture of FIG. 1 illustrates a data storage system 100 that comprises multiple data storage devices (DSDs) 120a (DSD1), 120b (DSD2), and 120n (DSDn), where n represents an arbitrary number of DSDs that may vary from implementation to implementation. Each DSD 120a-120n is under the control of and communicative with one or more system controllers 102a, 102b via a respective communication interface 110a, 110b, according to a corresponding communication protocol 111. Each system controller 102a, 102b includes memory 104a, 104b (e.g., some form of RAM), a processor 106a, 106b, and stored firmware 108a, 108b which is executable by the respective processor 106a, 106b.

Processing, functions, procedures, actions, method steps, and the like, that are described herein as being performed or performable by system controller 102a, 102b may include enactment by execution of one or more sequences of instructions (e.g., embodied in firmware 108a, 108b) stored in one or more memory units (e.g., ROM inherent to firmware) and which, when executed by one or more processors (e.g., processor 106a, 106b), cause such performance. The executable sequences of instructions are not limited to implementation in firmware such as firmware 108a, 108b as exemplified in FIG. 1, but may be embodied in any form of and/or combination of hardware, software, and firmware. Each controller 102a, 102b may also be embodied in any form of and/or combination of hardware, software, and firmware. For example, and according to an embodiment, each system controller 102a, 102b may comprise an application-specific integrated circuit (ASIC) comprising at least one memory unit (e.g., ROM) for storing such instructions and at least one processor (e.g., processor 106a, 106b) for executing such instructions, enabling dynamic allocation of storage space from a shared storage pool across multiple different redundancy levels.

The data storage system 100 may be communicatively coupled with a host 150, which may be embodied in a hardware machine on which executable code is executable (for non-limiting examples, a computer or hardware server, and the like), or as software instructions executable by one or more processors (for non-limiting examples, a software server such as a database server, application server, media server, and the like). Host 150 generally represents a client of the data storage system 100, and has the capability to make read and write requests to the data storage system 100 on behalf of one or more applications 155 (depicted as APPL1, APPL2, APPLn, where n represents an arbitrary number of applications that may vary from implementation to implementation). Note that each system controller 102*a*. 102*b* may also be referred to as a "host" because the term is at times generally used in reference to any device that makes, passes through, or otherwise facilitates I/O calls to a data storage device or an array of devices.

Introduction

References herein to "an embodiment", "one embodiment", and the like, are intended to mean that the particular feature, structure, or characteristic being described is included in at least one embodiment of the invention. However, instance of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Recall that data storage devices in a RAID group can only be concurrently replaced up to the device redundancy limit and, therefore, replacing the whole group of devices is a significantly expensive operation because, for each replacement procedure, all the devices are traversed to build the data on the replacement devices. However, a storage system lifecycle use case regarding device/capacity management, which provides for bulk replacement of the devices (for example, in a ZFS-based (Z File System) single parity, double parity or triple parity RAID group), is contemplated. Such an approach may be used, for example, as a failure prevention mechanism or to upgrade the devices to higher capacity drives if and when needed, with less exposure to degraded performance and potential data loss risk were a multiple drive failure to occur during the device replacement process. Hence, a more efficient approach to online replacement of in-use storage devices, and space shrinking to reduce the number of devices, may be desirable.

Bulk Replacement of Online Raid Storage Devices

Figure 2:
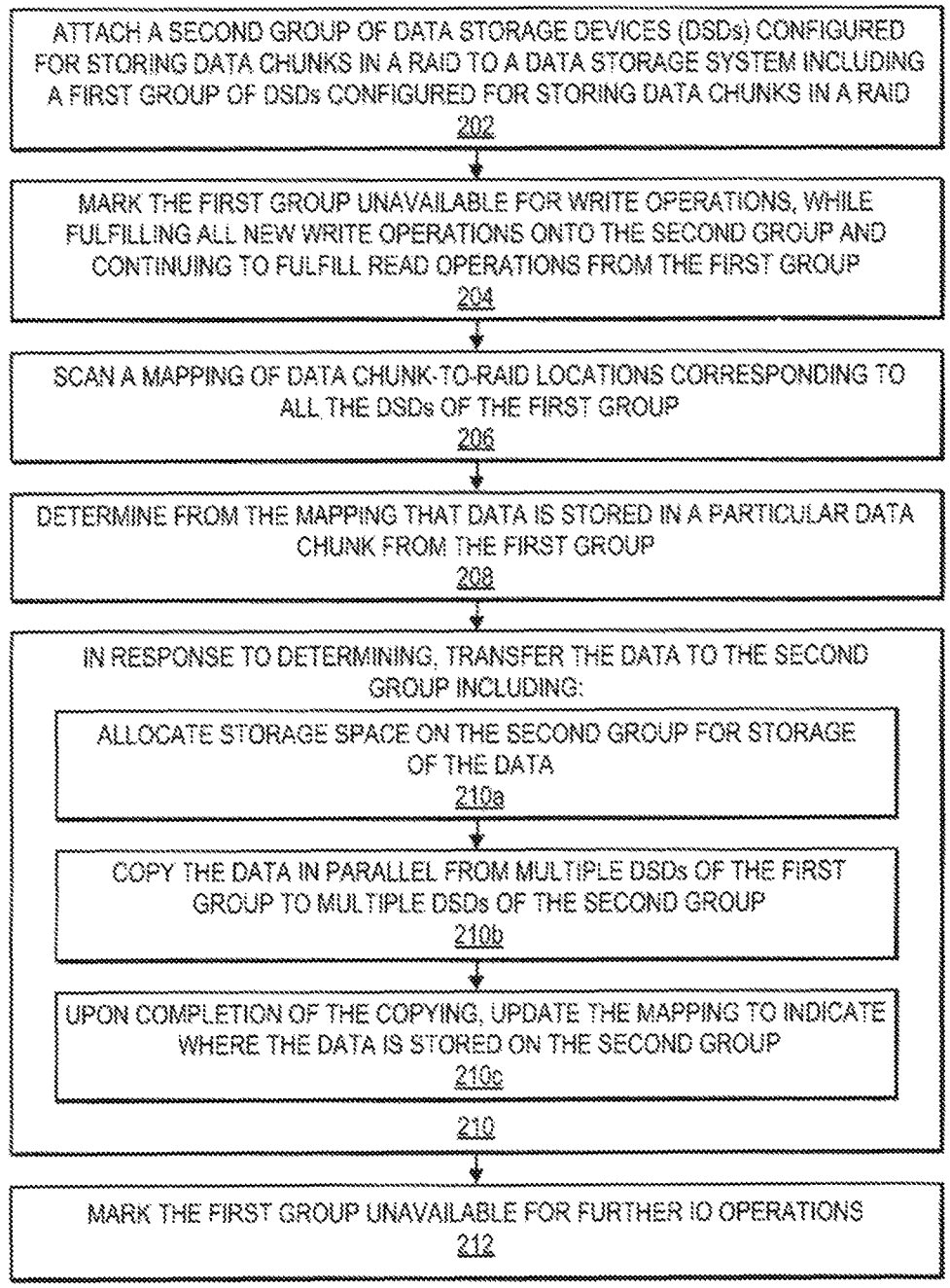
FIG. 2 is a flow diagram illustrating a process for replacement of a group of online RAID data storage devices, according to an embodiment.

FIG. 2 is a flow diagram illustrating a process for replacing a group of online RAID data storage devices, according to an embodiment. The process illustrated in FIG. 2 is described herein with reference to the example storage system architecture of FIG. 1. The process, procedure, method of FIG. 2 may be implemented for execution as one or more sequences of instructions stored in one or more memory units and which, when executed by one or more processors, cause performance of the process. For example, the sequences of instructions (e.g., embodied in firmware 108*a*, 108*b* of controller 102*a*, 102*b* of FIG. 1) stored in one or more memory units (e.g., ROM inherent to firmware) and which, when executed by one or more processors (e.g., processor 106*a*, 106*b* of controller 102*a*, 102*b* of FIG. 1), cause performance of the process illustrated in FIG. 2.

In a method of replacing a first group (DSDs 120*a*-120*j*, for purposes of example) of data storage devices (DSDs) configured for storing data chunks in a RAID (Redundant Array of Independent Disks), at block 202 a second group of DSDs configured for storing data chunks in a RAID is attached. For example, with DSDs 120*a*-120*j* configured as a top level vdev (virtual device), additional DSDs such as DSDs 120*a*-120*n* (FIG. 1) (DSDs 120*k*-120*t*, for purposes of example) are perhaps added to an existing rack, communicatively connected to a system controller 102*a*, 102*b* (FIG. 1), powered up, configured for operation as a RAID group for participation in a storage pool for allocating storage space for a host 150 (FIG. 1), e.g., configured as a new top level vdev, and the like. From the standpoint of a system controller 102*a*, 102*b*, configuration-type actions are generally seen as and/or referred to herein as "attaching" the second group of DSDs.

At block 204, the first group of DSDs is marked as unavailable for write operations, while continuing to fulfill read operations from the first group of DSDs and fulfilling all new write operations onto the second group of DSDs. For example, a "noalloc" (no allocation command or setting) is set on the first group, thereby preventing new allocations of storage space (i.e., for write operations) from the first group, effectively blocking new data from being written to the first group of DSDs 120*a*-120*j*, whereby the new allocations immediately start coming from the second group of DSDs 120*k*-120*t*. From the standpoint of a system controller 102*a*, 102*b*, receiving such a no allocation command or setting is seen as and/or referred to herein as "marking" the second group of DSDs.

At block 206, a mapping of data chunk-to-RAID locations corresponding to all the DSDs in the first group is scanned. For example, a scan, read, walk of chunk-map-headers, i.e., metadata created when a chunk is crated and that maintains the chunk-to-RAID location mapping, is performed. According to an embodiment, a scan of the chunk-map-headers corresponding to all the slabs (i.e., stripes, or disk regions) associated with the first group vdev is performed sequentially, rather than performed as random IO (input/output) operations, whereby sequentially scanning is a more efficient procedure than randomly scanning.

At block 208, it is determined from the mapping that some data is stored in a particular data chunk from the first group. For example, by scanning the chunk-map-headers and associated free bitmaps (described in more detail elsewhere herein) the system controller 102*a*, 102*b* is able to determine which slabs have "active" chunks of data, i.e., data chunks that are actually currently in use in that data is stored in their respective memory space. According to an embodiment, determining at block 208 includes determining in which one or more sub-chunks, of a given chunk, data is actually stored, e.g., from a free bitmap. Hence, sub-chunks that are not currently storing data need not be copied over to the new second group of DSDs. According to an embodiment, determining at block 208 includes determining in which one or more sub-chunks, of a given chunk, data is stored that is still referenced by a client (e.g., APPL1-APPLm 155 of FIG. 1). For context, when a client deletes data, the associated sub-chunks may be marked as free, but such sub-chunks may not be immediately and entirely freed according to additional procedural steps that may need to be completed. Hence, procedural bandwidth need not be wasted on copying quasi-freed sub-chunks that are still currently storing data that is no longer referenced by a client application.

At block 210, in response to determining at block 208 that some data is stored in a particular data chunk from the first group, then the data is transferred to the second group of DSDs. For example, at block 210a storage space that can store the in-use data is allocated on or from the second group of DSDs 120k-120t. Then, at block 210b, the data is actually copied from at least some of the first group of DSDs 120a-120j to at least some of the second group of DSDs 120k-120t. Then, at block 210c, upon completion of the data copying procedure, the mapping (e.g., chunk-map-header metadata) is updated to indicate where the data is stored on the second group. Blocks 2101-210c are repeated until all the in-use data chunks from the first group are copied or migrated to the second group.

Notably, and according to an embodiment, the data copying or migration procedure is executed in parallel from the multiple devices of the first group, on which the in-use data is stored, to the multiple devices on the second group. For example, in the exemplary context of a RAID 6 group, a data chunk would span 8 drives due to striping, so the read operations on the first group of DSDs 120a-120j are executed in parallel. Likewise, the data chunk would span 8 drives on the new second RAID 6 group of DSDs, so the write operations on the second group of DSDs 120k-120t would also be executed in parallel. Thus, the whole power of the DSDs is effectively harnessed, and the data is copied "as is" (e.g., not copying from one logical block address (LBA) in the first group to the same LBA in the second group), thereby providing an efficient process in terms of time and the use of computing resources.

According to an embodiment, a recompaction (e.g., akin to defragmentation) infrastructure and procedure is utilized for execution of blocks 206-210, effectively a forced recompaction. For example, at least a portion of the recompaction infrastructure (e.g., logic, logs, indexes, bitmaps, other data structures) and procedure illustrated and described in U.S. patent application Ser. No. 15/887,960, which is incorporated by reference in its entirety for all purposes as if fully set forth herein, is utilized for this purpose. As described in the referenced U.S. Patent Application, with regards to the recompaction process, a first log (L1) is maintained, comprising appended entries identifying free (unused) storage space available from multiple storage regions R1-Rn of a storage allocation pool, where each storage region R1-Rn is associated with multiple storage chunks Cnm. Further, each log entry of L1 comprises a storage chunk ID and corresponding subchunk IDs associated with a respective storage chunk Cnm having free storage space available, whereby the logical address space of the available free storage space from a respective storage chunk Cnm is determinable from the storage chunk ID and corresponding subchunk IDs. Hence, the L1 represents the chunk logical address space, e.g., a "chunk-map". Based on the first L1 log, a second log (L2) is generated and maintained comprising a respective appended bitmap identifying the free storage space available from each one or more corresponding storage chunk Cnm of a given storage region Rn, where generating and maintaining the L2 log may comprise sorting L1 log entries by their physical addresses, coalescing L1 log entries for each one or more storage chunk Cnm, and generating the respective free bitmap for each storage chunk Cnm based on the coalesced L1 log entries. Hence each L2 log represents an allocation address space range, i.e., identifying the actual free physical space corresponding to sub-chunks for a given storage chunk.

However, rather than utilizing the recompaction infrastructure to focus on freeing chunks to generate free space, with a further focus on discovering the chunks with maximum sub-chunks free, the logic behind scanning the chunk-map-header metadata at block 206 is focused on discovering and identifying the active or in-use chunks, and bypassing the slabs and/or chunks that are not in use, as discussed elsewhere herein. For example and as discussed, the recompaction infrastructure includes the free bitmap(s) and/or index indicating which sub-chunks of a chunk are free (e.g., the L2 log or a data structure associated with or constituent to the L2 log), which also inherently indicates which sub-chunks are not free and therefore are storing data. However, in the case of full chunks, which would not normally correspond to an L2 entry due to having no free space, according to an embodiment a temporary null free-map is created corresponding to each full chunk to indicate that the chunk is full, thereby allowing for or maintaining the ability to sequentially scan the chunk-map-header metadata to identify the chunks storing data. Furthermore, to the extent that the recompaction infrastructure is used here, it is used as a copying mechanism, i.e., not for the purpose of recompacting slabs/chunks/sub-chunks, per se, by freeing, deleting, returning to the pool, etc.

Once all the data is copied from the first group to the second group, at block 212 the first group of DSDs is marked unavailable for further IO operations. For example, the vdev corresponding to the first group of DSDs 120a-120j is removed from the data storage system 100 (FIG. 1) configuration.

Thus, replacing a set of devices in bulk at the same time can provide a lifecycle use case advantage, such as where the storage system may be potentially at risk of losing data and/or operating at degraded performance, for non-limiting examples, whereby this approach can also serve to minimize the time window of the exposure.

Device Pool Shrinking

Device pool shrinking (i.e., reducing the total number of physical devices, DSDs, for a given storage pool) may be available for a RAID-Mirror, however, there is no known mechanism to achieve the same for RAID 5/6 configurations. For example, there may be a storage pool with two sets/groups of RAID 6 devices (8+2 devices for each group), and at some point the total data storage can fit in one set of the devices, then it may be desirable to eliminate one group of the devices. Hence, a derivative of the foregoing "bulk device replacement" process may be used for device pool shrinking, such as when a storage pool corresponds to more than one top level vdev and when the remaining vdevs have enough space to be able to hold the space from the top level vdev being shrunk, according to an embodiment. Thus, for pool shrinking, the total amount of data stored on a RAID group of DSDs (e.g., the foregoing second RAID group, or vdev) is determined, and that another group of system DSDs configured for storing data chunks in a RAID (e.g., a third RAID group, or vdev) has enough storage space to store the total amount of data stored on the second group is determined.

From there, similarly to blocks 204-212 of FIG. 2, the second group is marked unavailable for write operations while continuing to fulfill read operations and while the third group begins to service new write operations, a forced recompaction is initiated including (a) scanning the second group mapping (metadata), (b) from which it is determined where data is stored in particular chunks of the second group, (c) transferring the active chunks from the second group to the third group via allocating, copying, and updating the mapping, and (d) removing the second group/vdev. Hence, device pool shrinking may provide administrative relief in various cases, such as for accidental addition of a wrong device or for reducing the capacity and/or removing a device, for non-limiting examples.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process operations may be set forth in a particular order, and alphabetic and alphanumeric labels may be used to identify certain operations. Unless specifically stated in the description, embodiments are not necessarily limited to any particular order of carrying out such operations. In particular, the labels are used merely for convenient identification of operations, and are not intended to specify or require a particular order of carrying out such operations.

What is claimed is:

1. A method of replacing a first group of data storage devices (DSDs) configured for storing data chunks in a RAID (Redundant Array of Independent Disks), the method comprising:
   attaching a second group of data storage devices configured for storing data chunks in a RAID;
   marking the first group unavailable for write operations, while fulfilling all new write operations onto the second group and continuing to fulfill read operations from the first group;
   scanning a mapping of data chunk-to-RAID locations corresponding to all the DSDs of the first group;
   determining from the mapping that data is stored in a particular data chunk from the first group;
   in response to determining, transferring the data to the second group by:
      allocating storage space on the second group for storage of the data,
      copying the data in parallel from multiple DSDs of the first group to multiple DSDs of the second group, and
      upon completion of the copying, updating the mapping to indicate where the data is stored on the second group; and
   marking the first group unavailable for further input/output (IO) operations.

2. The method of claim 1, wherein:
   determining comprises determining in which one or more sub-chunks of the data chunk the data is stored; and
   copying comprises copying only the one or more sub-chunks in which the data is stored.

3. The method of claim 1, wherein:
   determining comprises determining in which one or more sub-chunks of the data chunk that data still referenced by a client is stored; and
   copying comprises copying only the one or more sub-chunks in which data still referenced by a client is stored.

4. The method of claim 1, wherein scanning comprises a sequential scanning of the mapping.

5. The method of claim 1, wherein:
   copying comprises copying the data from a first stripe beginning at a first logical block address (LBA) on the first group to a second stripe beginning at a second logical block address (LBA) on the second group; and
   the first LBA is different from the second LBA.

6. The method of claim 1, further comprising:
   determining a total amount of data stored on the second group;
   determining that a third group of data storage devices configured for storing data chunks in a RAID comprises at least enough storage space to store the total amount of data stored on the second group but not as much total available storage space as the second group;
   marking the second group unavailable for write operations, while fulfilling all new write operations onto the third group and continuing to fulfill read operations from the second group;
   scanning the mapping corresponding to all the DSDs of the second group;
   determining from the mapping that data is stored in a particular data chunk from the second group;
   in response to determining, transferring the data to the third group by:
      allocating storage space on the third group for storage of the data,
      copying the data in parallel from multiple DSDs of the second group to multiple DSDs of the third group, and
      upon completion of the copying, updating the mapping to indicate where the data is stored on the third group.

7. A data storage system comprising:
   a plurality of data storage devices (DSDs) configured for storing data chunks in a RAID (Redundant Array of Independent Disks); and
   a system controller circuitry comprising memory and one or more processors and embodying one or more sequences of instructions which, when executed by the one or more processors, cause performance of:
      marking a first group of the plurality of DSDs unavailable for write operations, while fulfilling all new write operations onto a second group of the plurality of DSDs and continuing to fulfill read operations from the first group;
      scanning a mapping of data chunk-to-RAID locations corresponding to all the DSDs of the first group;
      determining from the mapping that data is stored in a particular data chunk from the first group;
      in response to determining, transferring the data to the second group by:
         allocating storage space on the second group for storage of the data, copying the data in parallel from multiple DSDs of the first group to multiple DSDs of the second group, and upon completion of the copying of the data, updating the mapping to indicate where the data is stored on the second group; and marking the first group unavailable for further input/output (IO) operations.

8. The data storage system of claim 7, wherein the one or more sequences of instructions, when executed, cause further performance of:

determining in which one or more sub-chunks of the data chunk the data is stored; and copying only the one or more sub-chunks in which the data is stored.

9. The data storage system of claim 7, wherein the one or more sequences of instructions, when executed, cause further performance of:

determining in which one or more sub-chunks of the data chunk that data still referenced by a client is stored; and copying only the one or more sub-chunks in which data still referenced by a client is stored.

10. The data storage system of claim 7, wherein the scanning comprises a sequential scanning of the mapping.

11. The data storage system of claim 7, wherein the one or more sequences of instructions, when executed, cause further performance of:

copying the data from a first stripe beginning at a first logical block address (LBA) on the first group to a second stripe beginning at a second different logical block address (LBA) on the second group.

12. The data storage system of claim 7, wherein the one or more sequences of instructions, when executed, cause further performance of:

determining a total amount of data stored on the second group;

determining that a third group of data storage devices configured for storing data chunks in a RAID comprises at least enough storage space to store the total amount of data stored on the second group but not as much total available storage space as the second group;

marking the second group unavailable for write operations, while fulfilling all new write operations onto the third group and continuing to fulfill read operations from the second group;

scanning the mapping corresponding to all the DSDs of the second group;

determining from the mapping that data is stored in a particular data chunk from the second group;

in response to determining, transferring the data to the third group by:

allocating storage space on the third group for storage of the data, copying the data in parallel from multiple DSDs of the second group to multiple DSDs of the third group, and upon completion of the copying, updating the mapping to indicate where the data is stored on the third group.

13. A data storage system comprising:

a plurality of data storage devices (DSDs);

means for marking a first group of the plurality of DSDs unavailable for write operations, while fulfilling all new write operations onto a second group of the plurality of DSDs and continuing to fulfill read operations from the first group;

means for scanning a mapping of data chunk-to-RAID locations corresponding to all the DSDs of the first group;

means for determining from the mapping that data is stored in a particular data chunk from the first group;

means for transferring the data to the second group in response to determining, including:

means for allocating storage space on the second group for storage of the data, means for copying the data in parallel from multiple DSDs of the first group to multiple DSDs of the second group, and means for updating the mapping to indicate where the data is stored on the second group; and means for marking the first group unavailable for further input/output (IO) operations.

14. The data storage system of claim 13, wherein:

the means for determining includes means for determining in which one or more sub-chunks of the data chunk the data is stored; and the means for copying includes means for copying only the one or more sub-chunks in which the data is stored.

15. The data storage system of claim 13, wherein:

the means for determining includes means for determining in which one or more sub-chunks of the data chunk that data still referenced by a client is stored; and the means for copying includes means for copying only the one or more sub-chunks in which data still referenced by a client is stored.

16. The data storage system of claim 13, wherein the means for scanning includes means for sequentially scanning the mapping.

17. The data storage system of claim 13, wherein:

the means for copying includes means for copying the data from a first stripe beginning at a first logical block address (LBA) on the first group to a second stripe beginning at a second different logical block address (LBA) on the second group.

18. The data storage system of claim 13, further comprising:

means for determining a total amount of data stored on the second group;

means for determining that a third group of data storage devices configured for storing data chunks in a RAID comprises at least enough storage space to store the total amount of data stored on the second group but not as much total available storage space as the second group;

means for marking the second group unavailable for write operations, while fulfilling all new write operations onto the third group and continuing to fulfill read operations from the second group;

means for scanning the mapping corresponding to all the DSDs of the second group;

means for determining from the mapping that data is stored in a particular data chunk from the second group;

means for transferring the data to the third group in response to determining, including:

means for allocating storage space on the third group for storage of the data, means for copying the data in parallel from multiple DSDs of the second group to multiple DSDs of the third group, and means for updating the mapping to indicate where the data is stored on the third group.

* * * * *